Patented Feb. 6, 1923.

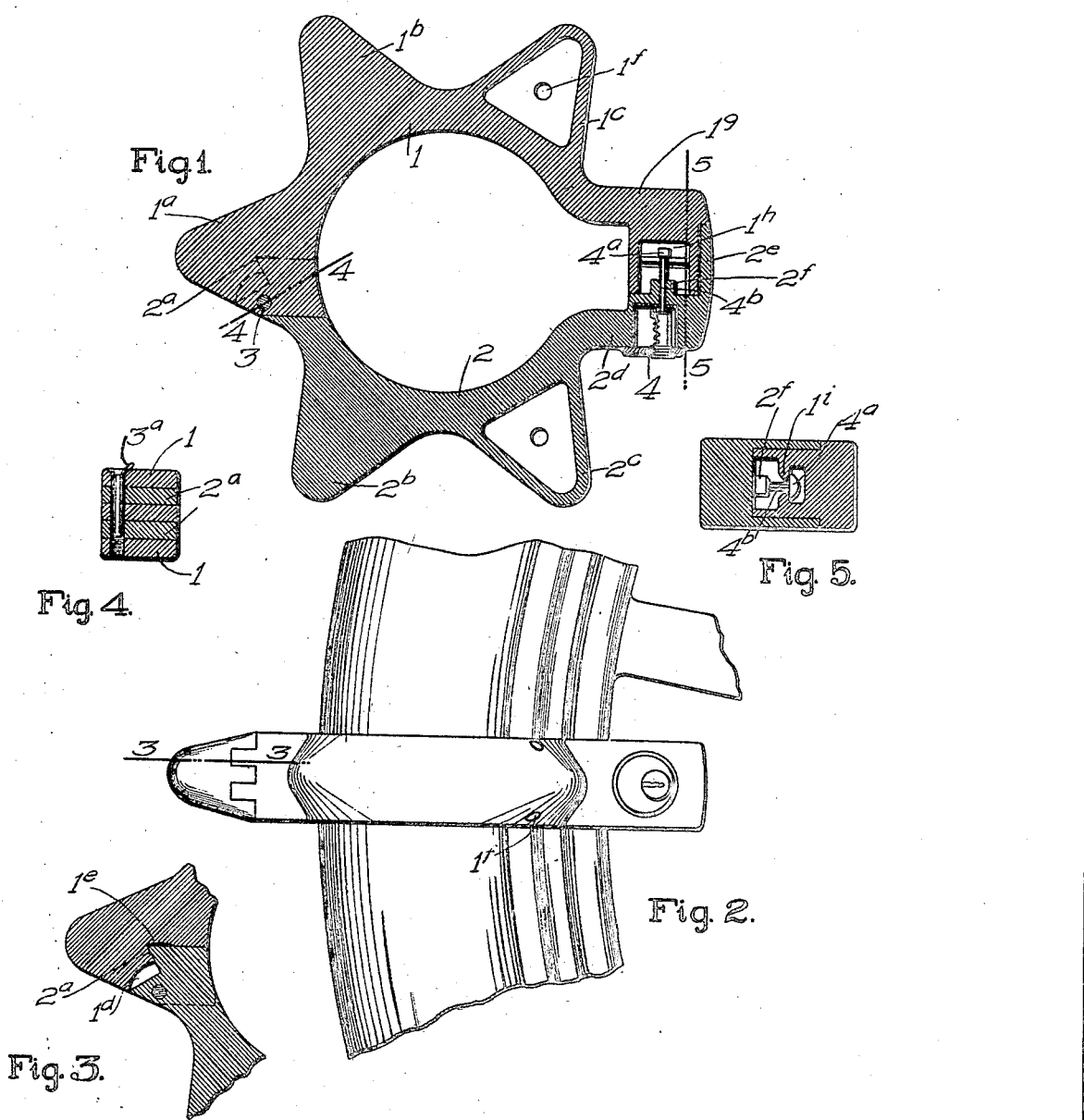

1,444,161

UNITED STATES PATENT OFFICE.

FREDERICK A. ARNOLD, OF SAN DIEGO, CALIFORNIA.

VEHICLE LOCK.

Application filed March 26, 1919. Serial No. 285,187.

*To all whom it may concern:*

Be it known that I, FREDERICK A. ARNOLD, a citizen of the United States, residing at San Diego, in the county of San Diego and State of California, have invented a certain new and useful Vehicle Lock, of which the following is a specification.

My invention relates to a device to be secured around the rim and tire of the wheel of a vehicle to prevent the moving of a vehicle without attracting attention, and the objects of my invention are: first, to provide a device of this class which is effective if turned on the tire and rim which may be done by partially deflating the tire; second, to provide a device of this class the hinge portion of which is so constructed that the pin may be removed and still the two parts could not be separated without opening the lock-side; third, to provide a device of this class in which the pivot member is secured in such a way that it is difficult to remove the same; fourth, to provide a device of this class with new and novel lock connecting means and fifth, to provide a device of this class which is simple and economical of construction, durable, easy to operate, easy for the owner to install and remove, and which will not readily deteriorate or get out of order and very efficient in its action.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a longitudinal sectional view through the middle thereof showing portions in elevation to facilitate the illustration; Fig. 2 is a side elevational view of a fragmentary portion of a vehicle wheel showing my device mounted thereon in elevation in position ready for use; Fig. 3 is a sectional view through 3—3 of Fig. 2; Fig. 4 is a sectional view through 4—4 of Fig. 1; and Fig. 5 is a sectional view through 5—5 of Fig. 1.

Similar characters of reference refer to similar parts and portions throughout the several views of the drawings.

The main member 1, swinging member 2, pin 3, and lock portion 4 constitute the principal parts and portions of my vehicle locking device.

The main member 1 consists of a metallic portion adapted to fit around the inflated tire and rim of the vehicle and extends past the middle thereof. It is provided with lugs $1^a$, $1^b$ and $1^c$. The lug $1^a$ is positioned so that it is in the middle of the outer surface of the tire when properly positioned as shown in Figs. 1 and 2 of the drawings. It is provided with a plurality of recesses $1^d$ and $1^e$ in one side thereof as shown best in Figs. 1 and 3 of the drawings, adapted to provide an interlocking hinge member, in the member 1. The lugs $1^b$ and $1^c$ are distributed on the outer surface of the member 1 to provide equal division between the lug $1^a$ and the lock end. The lug $1^b$ is a solid lug but the lug $1^c$ is hollow and provided with holes $1^f$ on opposite sides with thin metal surrounding said holes to provide a whistle for making an audible sound when the device is moved sidewise at a rapid rate through the air, as would be the case if the device were secured to the wheel of the vehicle and the vehicle moved off at a moderate rate of speed. The member 2 is hinged to the member 1 on the pin 3 which is a countersunk bolt threaded on one end adapted to screw into the lug member 1 to prevent the drifting of said pin and it is also provided with a lug $3^a$ extending on one side which is adapted to facilitate the turning of said bolt and to bend down into a notch in the member 1 to prevent the turning of the member on the pin 3 after it is positioned. This member 2 is provided with a double extended hinge portion $2^a$ which is adapted to extend into the recesses $1^e$ and to prevent the removal of the member 2 from the member 1 in case the pin 3 is removed and the lock still in position. This member 2 is provided with lugs $2^b$ and $2^c$ conforming to the lugs $1^b$ and $1^c$ of the member 1 and in similar relative position thereto on the opposite side of the tire when in position for use. The two members 1 and 2 are provided with extended portions $1^g$ and $2^d$ which extend over the rim of the wheel, the member $1^g$ being provided with a recess portion $1^h$ provided with inwardly extended lugs $1^i$ as shown best in Fig. 5, which is adapted to be engaged by the lug $4^a$ on the lock member $4^b$ when turned to a certain position relative thereto. This lock 4 is preferably an ordinary lock with a specific key form for each individual lock, and the member $2^d$ is extended at $2^e$ so that it overlaps the lock portion and recess portion $1^h$ for covering and strengthening this portion. It will be noted that the member $2^d$ is also provided with an extended portion $2^f$ which is for the purpose of reinforcing the portion $2^d$ around the lock member $4^b$ and prevent cutting the member $4^b$ with a chisel if attempted.

Though I have shown and described a particular construction, combination and arrangement of parts and portions I do not wish to be limited to this particular construction, combination and arrangement, but desire to include in the purview of my invention the construction, combination and arrangement substantially as set forth in the appended claims.

It is obvious that with this construction there is provided a device for locking vehicles which will attract attention if the vehicle is moved without removing the lock, that the lock is equally effective if the tire is deflated and the lock turned on the wheel and rim to various positions. That there is provided means for making an audible sound if it is attempted to drive the vehicle with the device in position on the wheel and rim. That the hinge portion of the device is provided with an interlocking projecting portion which will prevent the separating of the members 1 and 2 at the hinge while the device is locked by removing the hinge pin. That the device as a whole is simple, economical of construction, durable and very efficient.

Having thus described my invention what I claim as new and desire to secure by Letters Patent, is:

1. In a device of the class described, a pair of members adapted to fit around a tire and rim, hinged together, means for locking the free ends of said members together, and interlocking hinge portions on one of said members adapted to engage the other member for preventing the removal of one member from the other if the hinge pin is removed while the device is locked.

2. In a device of the class described, a pair of members adapted to fit around a tire and rim hinged together, each provided with a plurality of outwardly extending lug members, means for locking the free ends of said members together and interlocking hinge portion on one of the said members adapted to engage the other member for preventing the removal of one member from the other if the hinge pin is removed while the device is locked.

In testimony whereof, I have hereunto set my hand at San Diego, California this 20th day of March, 1919.

FREDERICK A. ARNOLD.